United States Patent
Maeda et al.

(10) Patent No.: US 7,721,255 B2
(45) Date of Patent: May 18, 2010

(54) SEQUENCE PROGRAM EDITING APPARATUS

(75) Inventors: Kimio Maeda, Hachiouji (JP); Junichi Yamaki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 1265 days.

(21) Appl. No.: 11/238,953

(22) Filed: Sep. 30, 2005

(65) Prior Publication Data

US 2006/0089728 A1  Apr. 27, 2006

(30) Foreign Application Priority Data

Oct. 21, 2004  (JP)  ............................. 2004-306704

(51) Int. Cl.
*G06F 9/44*  (2006.01)
*G06F 17/00*  (2006.01)
*G05B 11/01*  (2006.01)

(52) U.S. Cl. .......................... 717/113; 715/255; 700/18
(58) Field of Classification Search ........................ None
See application file for complete search history.

(56) References Cited

U.S. PATENT DOCUMENTS

| | | | |
|---|---|---|---|
| 5,142,469 A | | 8/1992 | Weisenborn |
| 5,267,145 A | * | 11/1993 | Zifferer et al. ................. 700/86 |
| 5,784,621 A | * | 7/1998 | Onishi et al. ................. 717/109 |
| 2002/0059567 A1 | * | 5/2002 | Minamide et al. ........... 717/151 |

FOREIGN PATENT DOCUMENTS

| | | |
|---|---|---|
| JP | 08-305417 | 11/1996 |
| JP | 9-319416 | 12/1997 |
| JP | 2002-140107 | 5/2002 |

OTHER PUBLICATIONS

Translated version of foreign patent publication JP 2002-140107, date pf plublication May 17, 2002, pp. 1-45.*
Omron, "CX-Programmer User Manual, version 2.1" 2001, pp. 1-134.*
European Search Report in corresponding EP Application No. 05256289.9-2206 mailed Feb. 24, 2006.
TRiLOGI Ladder Logic Editor, XP-002366922, Aug. 3, 2003,retrieved from the Internet.
Orfali, Robert et al.: "The Essential Distributed Objects Survival Guide", 1996, John Wilwey & Sons, Inc., New York, XP002366923, pp. 479-481.
Japanese Patent Office Notice of Reasons for Rejection, mailed Oct. 17, 2006, and issued in priority Japanese Patent Application No. 2004-306704.

* cited by examiner

*Primary Examiner*—Tuan Q Dam
*Assistant Examiner*—Zheng Wei
(74) *Attorney, Agent, or Firm*—Staas & Halsey LLP (57) ABSTRACT

A sequence program editing apparatus according to the present invention includes: program storing means for storing an application program including the sequence program; information storing means for storing symbol information and/or comment information used in the sequence program; selecting means for, in a state in which a plurality of application programs including at least first and second application programs runs, selecting at least a part of a sequence program displayed on an application screen run by the first application program; extracting means for extracting the symbol information and/or the comment information included in at least the selected part of the sequence program from the information storing means; and copy means for copying at least the selected part of the sequence program on the sequence program displayed on the application screen run by the second application program and copying the extracted symbol information and/or the extracted comment information on the information storing means of the second application.

3 Claims, 6 Drawing Sheets

SEQUENCE PROGRAM EDITING APPARATUS

BACKGROUND OF THE INVENTION

1. Field of the Invention

The present invention relates to an editing apparatus which exchanges data between a plurality of windows on which a plurality of application programs for processing data of a sequence program operates to edit the sequence program.

2. Description of the Related Art

In a control device such as a programmable controller, a sequence program is executed by a microprocessor to perform sequence control. The sequence program loads an application for editing a sequence program on a general-purpose personal computer to design a sequence program on the personal computer. The designed sequence program simulates a sequence operation of the program on the personal computer. A simulation result is verified, and the verification result is returned to the sequence program and debugged, thereby completing a sequence program. The completed sequence program is transferred to the programmable controller.

The sequence program is popularly designed by a ladder graphic language obtained by applying a ladder graphic. The ladder graphic expresses contents and procedures of control by sequentially arranging symbols of a relay, a coil, and the like, graphics expressing functions, and data and labels related to the symbols and the graphics along a sequence between power lines.

On the other hand, a general data processing device including a multi-window or a multi-task environment can use a function called a "cut-and-paste" function or a "copy-and-paste" function. This function is a function of fetching data processed by an application operated on another window in an application operated on one window, so that the data can be exchanged between the windows.

In this function, although a data exchange between a plurality of windows is performed through a temporary storage area called a "clip board", a data format which can be handled through the "clip board" is limited to a character code or bitmap data. For this reason, the data format cannot be handled by a ladder program described in the ladder graphic language, so that it is disadvantageously impossible to use a function such as the "cut-and-paste" function in editing of a sequence program of a ladder graphic. A solution for the problem is disclosed in Japanese Patent Application Laid-Open No. 9-319416.

In this patent document, when data of a sequence program used in a programmable controller such as a ladder graphic is exchanged between a plurality of windows, a shared data area for storing data to be given to another window is provided. The data passes through the shared data area to make it possible to exchange ladder graphic data or the like between the plurality of windows.

According to data processing disclosed in the patent document, a plurality of applications runs to make it possible to copy, paste, and edit a sequence program between the applications. However, a symbol or comment information cannot be disadvantageously edited by copy.

When the sequence program is edited on a screen by the data processing described above, editing is performed such that the sequence program is copied and then pasted on another program to make it easy to edit the sequence program on a ladder graphic. However, this editing cannot cope with a symbol or comment information.

In a general sequence program, not only a ladder program described in a ladder graphic language, but also a description of symbol/comment, or the like used in the sequence program are described.

The sequence program itself can be subjected to an editing operation such as copy and paste. However, with respect to the symbol or the comment information, address regions of respective sequence programs and available instruction words are arbitrarily described by a designer. For this reason, address regions in which symbols and comment information can be used in units of sequence programs, available instruction words, and the like are uniquely set and are not shared. When the type of a programmable controller in a copy source is different from the type of a programmable controller in a destination where the sequence program is pasted, address regions in which the symbols and comment information can be used, available instruction words, and the like are different from each other.

For this reason, information about symbols or comments of the sequence program cannot be edited on an editing screen of the program, and the information must be manually input on a symbol/comment editing screen. For this reason, a long period of time is required for an editing operation.

SUMMARY OF THE INVENTION

A sequence program editing apparatus according to the present invention automatically extracts symbol information and comment information used in a program part selected by a sequence program of a copy source when a sequence program is copied, and the extracted symbol information and the extracted comment information are copied on a sequence program in the copy destination. In this manner, in addition to the sequence program, the symbol information and the comment information can also be copied to make it possible to easily edit the sequence program by diverting an existing program. For this reason, the operability of creation and editing of the sequence program can be improved.

A sequence program editing apparatus according to the present invention includes: program storing means for storing an application program including the sequence program; information storing means for storing symbol information and/or comment information used in the sequence program; selecting means for, in a state in which a plurality of application programs including at least first and second application programs runs, selecting at least a part of a sequence program displayed on an application screen run by the first application program; extracting means for extracting the symbol information and/or the comment information included in at least the selected part of the sequence program from the information storing means of the first application; and copy means for copying at least the selected part of the sequence program on the sequence program displayed on the application screen run by the second application program and copying the extracted symbol information and/or the extracted comment information on the information storing means of the second application.

An application program causes a computer to execute a predetermined process to control driving operations of various devices, and includes a sequence program in which operation contents and procedures are described. According to the present invention, the sequence program editing apparatus which is to create and edit the sequence program copies a whole or a part of an existing sequence program to make it easy to create and edit the sequence program.

The sequence program includes information related to symbol/comment information used in the sequence program.

The sequence program is stored in program storing means, and symbol/comment information is stored in information storing means. The program storing means and the information storing means may be constituted by independent storing devices or independent storing areas set in the same storing device. In the configuration of any storing means, the sequence program and the symbol/comment information are set in an address region prepared to store the program or the information. A predetermined program step and the symbol/comment are specified by the address of the address region.

The selecting means included in the present invention which is to select a whole or a part of a sequence program performs selection by designating a predetermined part of a sequence program displayed on a screen. At this time, a plurality of application programs including first and second application programs is run to display a sequence program of the plurality of application programs on the screen.

When a whole or a part of the sequence program in the first application program is used in the sequence program in the second application program, a part (selected program part) to be copied is selected from a sequence program of a copy source, and the position of a destination where the selected program part is copied on the sequence program in the second application program is selected. A region of the selected program part and the position of the copy destination can be displayed on a screen.

The extracting means extracts symbol information and comment information included in the selected sequence program from the information storing means.

Extraction of symbol information by the extracting means can be performed as follows. For example, a symbol included in the selected sequence program part is retrieved, and the symbol detected in the retrieval is retrieved in the information storing means and the symbol information is read. In the retrieval of the symbol in the information storing means, a corresponding table between symbols and addresses at which pieces of information related to the symbols are stored can be used.

Extraction of comment information by the extracting means can be performed as follows. For example, it is detected whether the selected sequence program part includes a comment or not. When the sequence program part includes the comment, the comment is retrieved from the information storing means and read. In the retrieval of the comment from the information storing means, a corresponding table between comments and addresses at which pieces of information related to the comments are stored can be used.

The copy means copies the selected program part at a selected position on an application screen run by the second application program and copies the symbol information and the comment information extracted by the extracting means on the information storing means.

The program storing means copies the selected program part at a predetermined position of a sequence program of a copy destination and orders addresses.

The symbol information and the comment information extracted by the extracting means are copied on the information storing means of an application of a copy destination and the addresses are ordered.

The program storing means and the information storing means have unique available address regions, respectively, and include address determining means which, when the selected program part is copied on the sequence program of the copy destination, determines whether the address of the first application program can be used in the second application program or not. Depending on the determination result obtained by the address determining means, an available address and an unavailable address are identifiably displayed.

An instruction determining means for determining whether an instruction word used in the first application program is an instruction word which can be used in the second application program or not is provided. Depending on a determination result obtained by the instruction determining means, an available instruction word and unavailable instruction words are identifiably displayed.

Output means for outputting the selected sequence program and the extracted symbol information and the comment information in a mnemonic code is further arranged to make it possible to display the sequence program, and the symbol information, and the comment information on a screen.

According to a sequence program editing apparatus of the present invention, information about a symbol and a comment used in a sequence program can be automatically edited on a program editing screen. In this manner, operability of editing and maintainability of the sequence program can be improved.

BRIEF DESCRIPTION OF THE DRAWINGS

The above described objects and characteristic features and other objects and characteristic features of the present invention will be apparent from the explanation of the following embodiments with reference to the accompanying drawings, wherein.

DETAILED DESCRIPTION OF THE PREFERRED EMBODIMENTS

Figure 1:
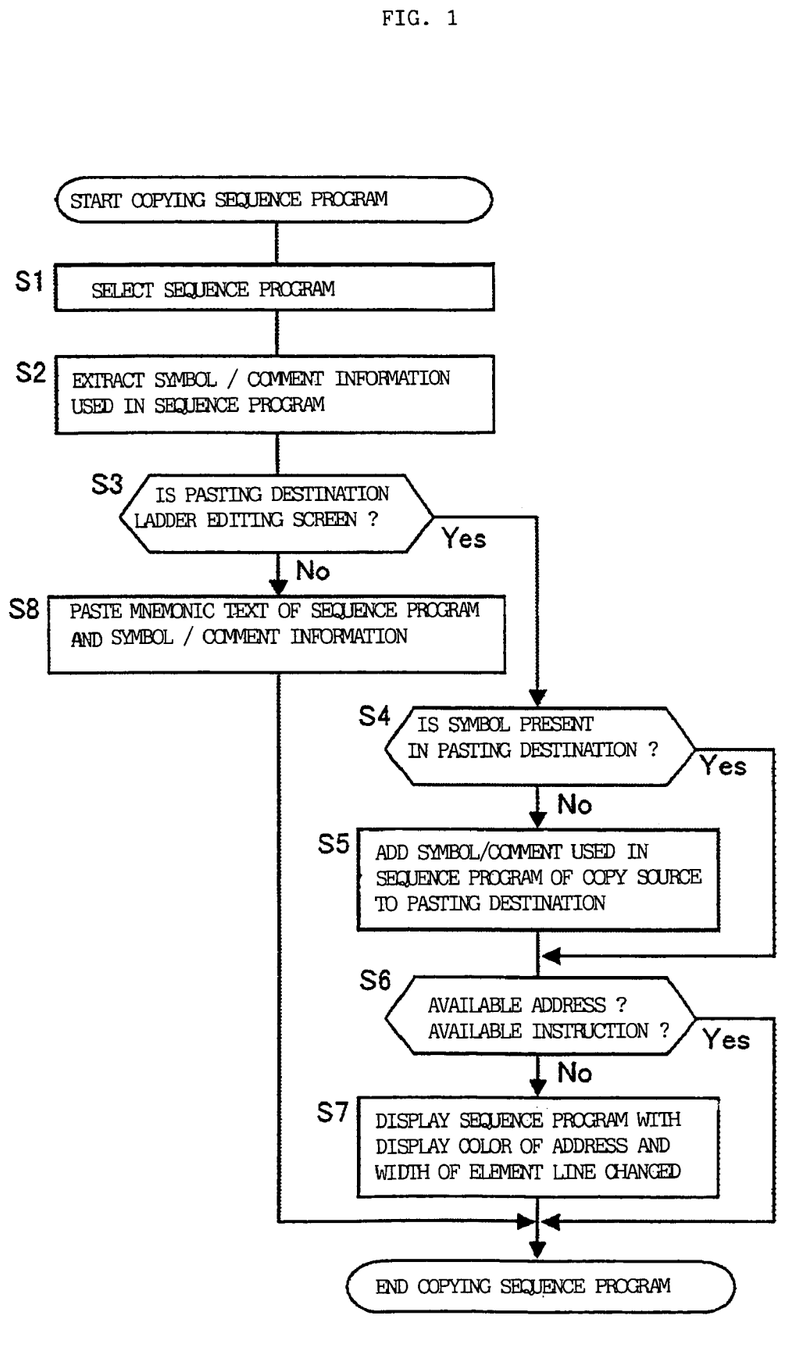
FIG. 1 is a flow chart for explaining an operation (processing in copying) of a sequence program editing apparatus according to the present invention.
Figure 2:
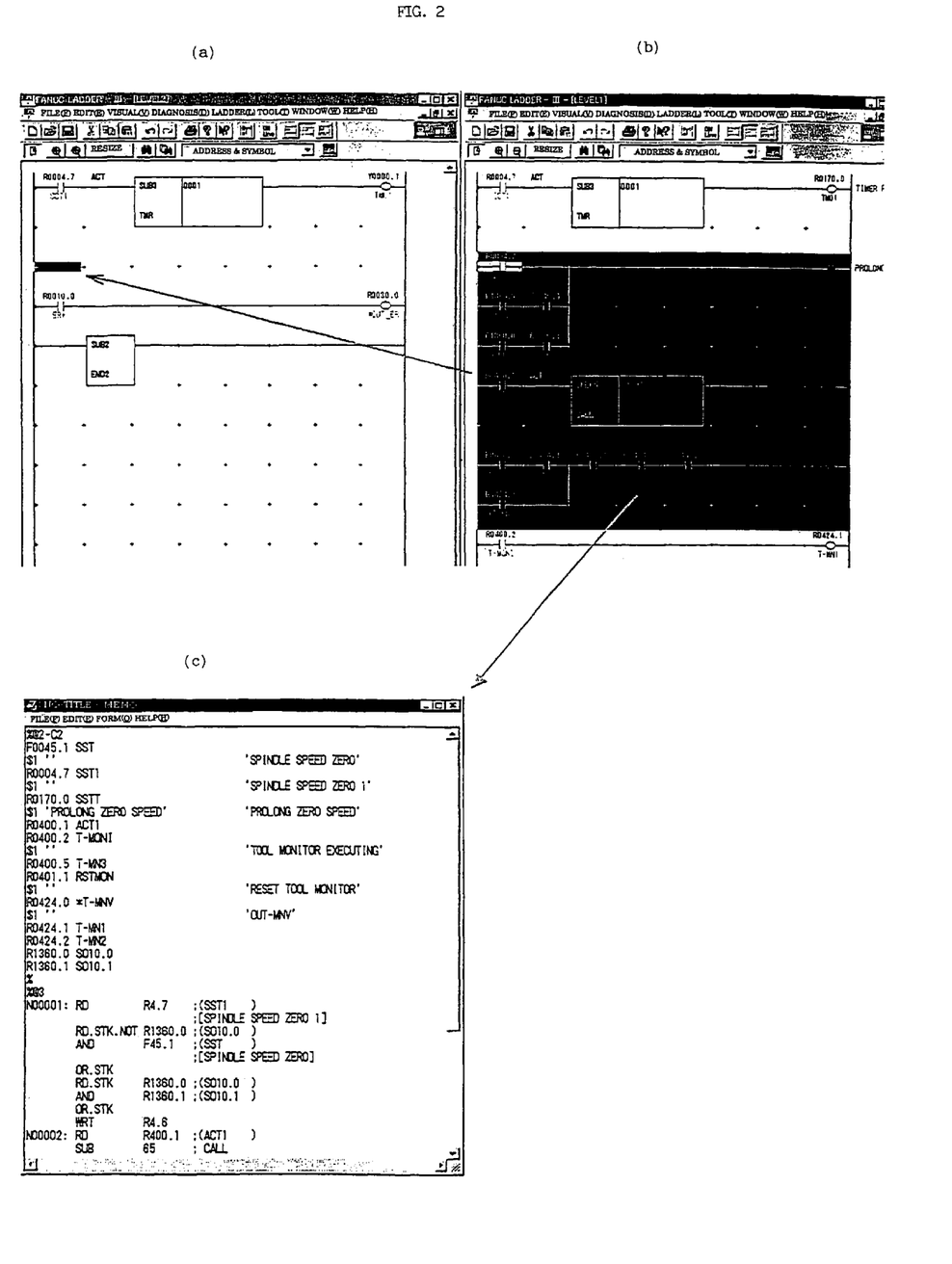
FIG. 2 shows operating displays for explaining an operation of the sequence program editing apparatus according to the present invention.
Figure 3:
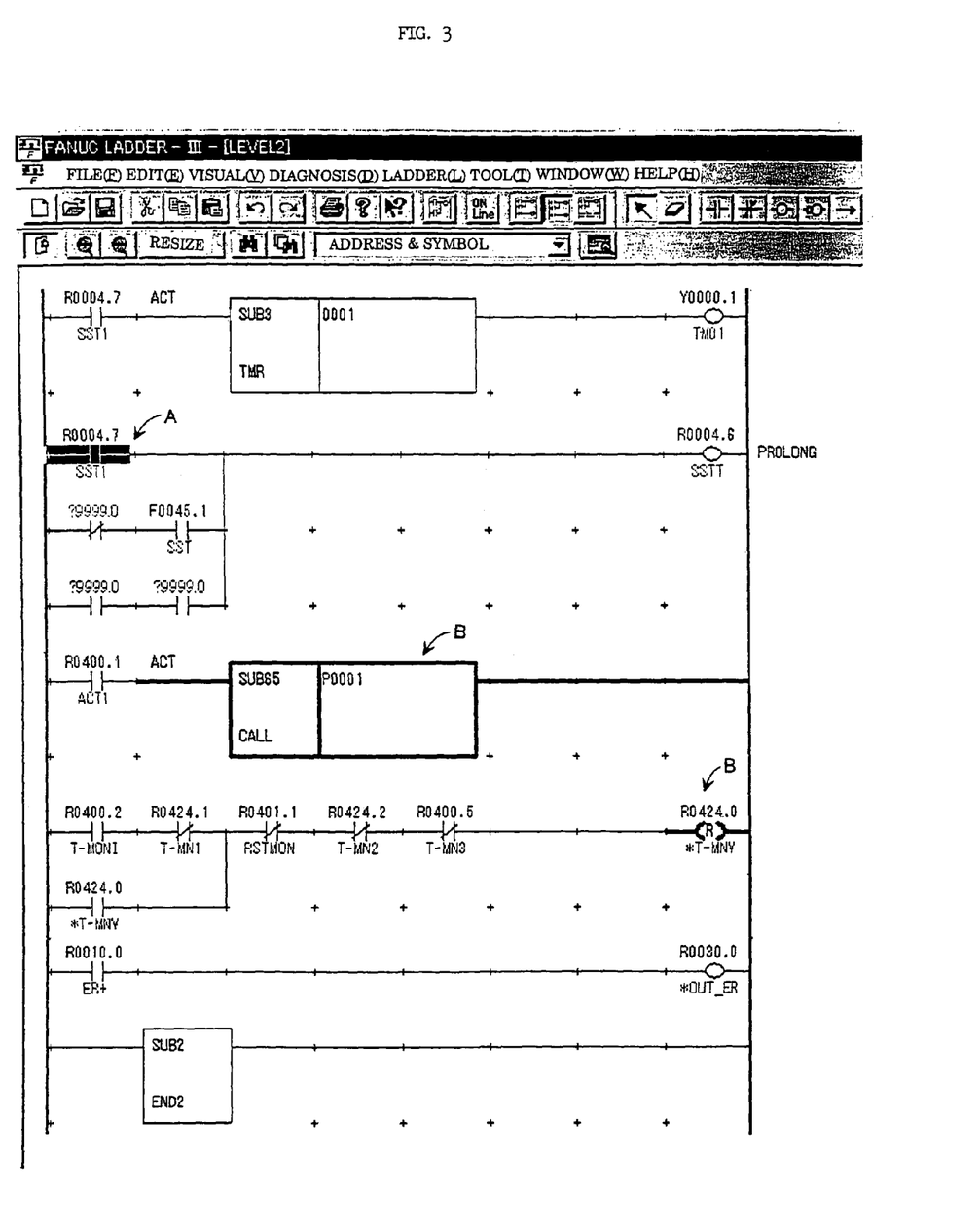
FIG. 3 is an operation display for explaining an operation (when an address or an instruction word cannot be used in a copy destination) of the sequence program editing apparatus according to the present invention.

FIG. 1 is a flow chart for explaining an operation (processing in copying) of a sequence program editing apparatus according to the present invention, and FIGS. 2 and 3 shows displays obtained by the operation.

When a plurality of application programs is run to display sequence programs included in the application programs on a display screen. A part is selected from one sequence program (of a copy source) of the plurality of application programs, and the selected part is copied on another sequence program (of a copy destination) to create and edit the sequence program.

An operation to be performed after the copy program of the sequence program is started, in a state where a plurality of sequence programs is displayed on the display screen, will be described below. Two sequence programs are displayed on a display screen, one of the sequence programs is used as a sequence program of a copy source, and the other is used as a sequence program of a copy destination. A plurality of sequence programs may be set in the copy source and the copy destination. For example, parts selected from sequence programs in a plurality of copy sources can be copied on a sequence program of one copy destination.

First, a program part to be copied on the sequence program of the copy source is selected (step S1). A region to be selected may be a whole of the sequence program or a part of the sequence program.

When there is symbol information related to a symbol used in the selected program part, or when comment information is given to the program part, such symbol information and comment information are extracted (step S2).

As a pasting destination where the selected program part is pasted on the sequence program of the copy destination, a ladder editing screen and another screen are used. On the ladder editing screen, the sequence program is displayed by a ladder diagram so that an editing process of the ladder diagram can be performed. On the other hand, as the screen other than the ladder editing screen, for example, a display screen of text information included in an application program or an OS as a function thereof can be used.

When the pasting destination of the selected program part is a ladder editing screen (step S3), it is determined whether a symbol is set in the sequence program of the pasting destination or not. When the symbol is not set (step S4), a symbol or a comment used in the sequence program of the copy source is added to the pasting destination (step S5).

In the determination in step S4, when a symbol is present in the sequence program of the pasting destination, or after symbol information or comment information is added to the sequence program of the pasting destination by the process in step S5, an address of the program part of the copy destination and an address at which the symbol information or comment information related to the symbol used in the program part is set are compared with a corresponding address of the sequence program of the copy destination to determine whether the address of the program part of the copy source can be used in the sequence program of the copy destination or not. An instruction word included in the program part of the copy source and an instruction word included in the sequence program of the copy destination are compared with each other to determine whether the instruction word in the program part of the copy source can be used in the sequence program of the copy destination or not (step S6).

In the determination in step S6, when the address or the instruction word of the program part of the copy source cannot be used in the sequence program of the copy destination, the sequence program is displayed on the display screen in a manner such that display forms of the sequence program such as a display color of the address and the thickness of an element are different from normal display forms, thereby informing a user that the address and the instruction word cannot be used (step S7).

In the process in step S3, when the pasting destination is a screen other than a ladder editing screen, the sequence program, the symbol information, and the comment information are pasted by text display of, e.g., a mnemonic code (step S8).

FIG. 2(a) shows a sequence program of a copy destination. A part indicated by a background in FIG. 2(b) shows a program part of a copy source. In addition, a part (black rectangle) indicated at a distal end of an arrow in FIG. 2(a) shows a pasting position where the program part in FIG. 2(b) is pasted.

The program part of the copy source in the sequence program and a pasting position in the sequence program can be designated on an editing screen.

FIG. 2(c) shows an example in which text display of a selected program part is performed by a mnemonic code.

FIG. 3 is a display example in which an address or an instruction word cannot be used in the copy destination. In FIG. 3, a part indicated by a mark A denotes an unavailable address. For example, the part is displayed by changing the display colors. A part indicated by a mark B denotes an unavailable instruction word. For example, the part is displayed by changing the widths of element lines.

The unavailable address and instruction word may be displayed by changing the display colors and the widths of the element lines, or may be displayed by other forms.

Figure 4:
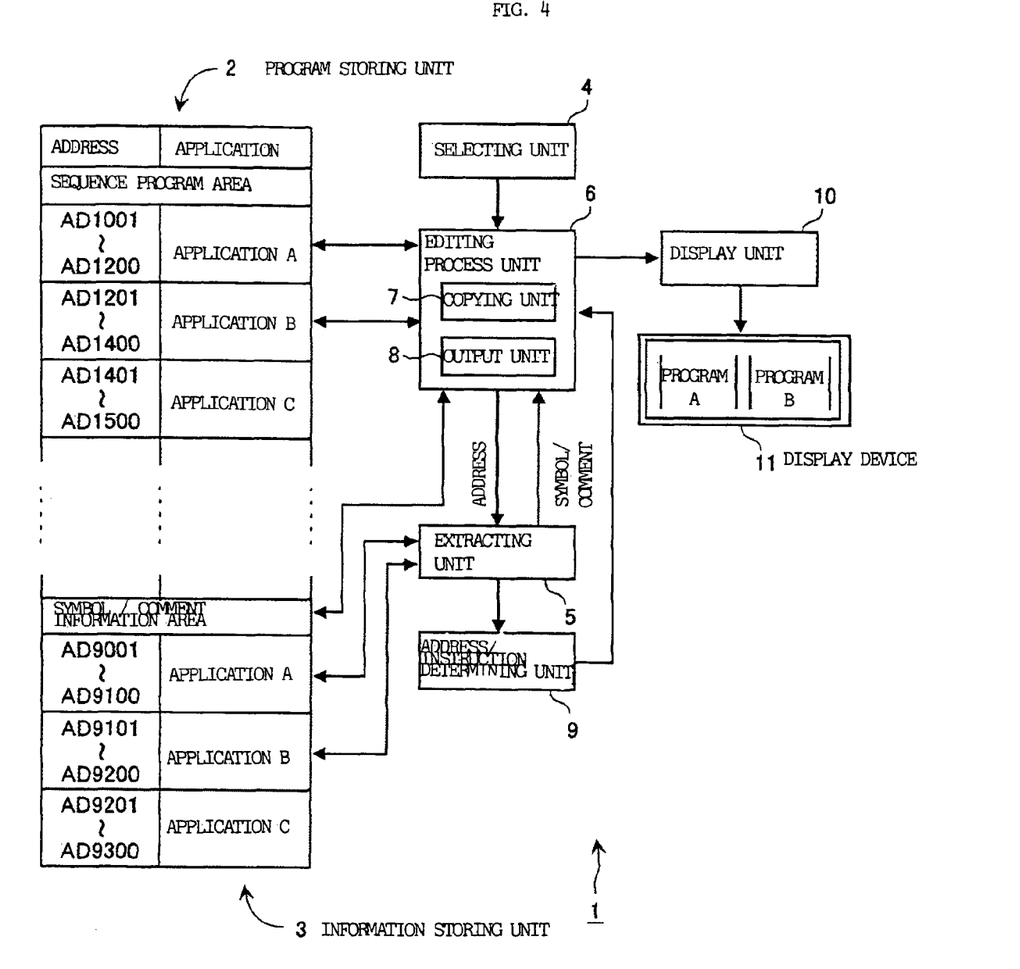
FIG. 4 is a schematic diagram for explaining a configuration of the sequence program editing apparatus according to the present invention.

FIG. 4 is a schematic diagram for explaining a configuration of the sequence program editing apparatus according to the present invention.

In FIG. 4, in a sequence program editing apparatus 1, a sequence program is formed and edited on a display device 11, and the formed and edited sequence program and symbol/comment information are stored in a storing unit.

The sequence program editing apparatus 1 includes a program storing unit 2 which stores an application program including a sequence program, an information storing unit 3 which stores symbol information and comment information used in the sequence program, a display unit 10 and a display device 11 which display a run application program, a selecting unit 4 which selects a part or a whole (program part) of the sequence program displayed on an application screen run by a first application program in a state in which a plurality of application programs including first and second application programs runs, an extracting unit 5 which extracts symbol information and/or comment information included in the program part selected by the selecting unit 4 from the information storing unit 3 of the first application program, a copy unit 7 which copies the sequence program including the program part selected by the selecting unit 4 on a sequence program displayed on an application screen run by the second application program and copies the symbol information and/or the comment information on the information storing unit 3 of the second application program, an address/instruction determining unit 9 which collates an address of a program part of a copy source with an address of a sequence program of a copy destination to determine whether the address of the program part of the copy source can be used in the sequence program of the copy destination or not or to determine whether an instruction word included in the program part of the copy source can be used in the sequence program of the copy destination or not, and an output unit 8 which outputs a mnemonic code describing the application program or the symbol/comment information to display the application program and the mnemonic code on a display screen of the display device 11.

The sequence program editing apparatus 1 comprises an editing process unit 6 including the copy unit 7 and the output unit 8 and performs the following editing process. That is, a program position of a destination on which the program part selected by the selecting unit 4 is to be copied is displayed on a display screen, and the address of the copied program or information is set in the program storing unit 2 or the information storing unit 3.

In FIG. 4, the editing process unit 6 is configured to comprise the copy unit 7 and the output unit 8. However, the editing process unit 6 may be configured to comprise the extracting unit 5 and the address/instruction determining unit 9.

In FIG. 4, the program storing unit 2 and the information storing unit 3 can be constituted by a sequence program area and a symbol/comment information area obtained by dividing a storage area included in one storing unit.

The sequence program area in the program storing unit 2 is a storing area prepared for a sequence program included in an application program. The sequence program area is divided into areas for respective application programs. In the example shown in FIG. 4, addresses AD1001 to AD1200 are prepared as sequence program areas of an application A, and addresses AD1201 to AD1400 are prepared as sequence program are as of an application B.

A symbol/comment information area in the information storing unit 3 is a storing area for symbol information or comment information used in a sequence program. The symbol/comment information area is divided into areas for respective application programs. In the example shown in FIG. 4, addresses AD9001 to AD9100 are prepared as symbol/comment information areas of the application A, and addresses AD9101 to AD9200 are prepared as symbol/comment information areas of the application B.

The program storing unit 2 and the information storing unit 3 are constituted by dividing a storing area of one storing unit by two. However, the program storing unit 2 and the information storing unit 3 may also be constituted by different storing devices, respectively.

The editing process unit 6 runs a plurality of application programs to cause the display unit 10 to display a sequence programs (the application A and the application B in FIG. 4) included in these application programs on a display screen of the display device 11.

While the plurality of sequence programs are displayed on the display screen of the display device 11, the selecting unit 4 selects a sequence program of a copy source and a sequence program of a copy destination from the plurality of sequence programs and selects a region (program part) to be copied with respect to the sequence program of the copy source. Furthermore, the selecting unit 4 selects and designates a position of the copy destination in which the copied (selected) program part is incorporated. The selection of the program part also involves selection of some sequence programs and selection of all the sequence programs. The selection and designation on the display screen can be performed by using a position selecting unit such as a mouse or a drag-and-drop function or a copy-and-paste function held by an OS.

The selecting unit 4 selects only a sequence program, and does not select symbol or comment information used in the sequence program. In creation and editing of the sequence program, the symbol and the comment are desirably copied and used together with the program. For this reason, in order to satisfy this demand, the extracting unit 5 in FIG. 4 extracts the information related to a symbol or comment information used in the program part selected by the selecting unit 4 and copies the extracted information on the sequence program of the copy destination to reflect the information on the creation and editing of the sequence program, thereby making it easy to perform the creating and editing processes of the program.

Figure 5:
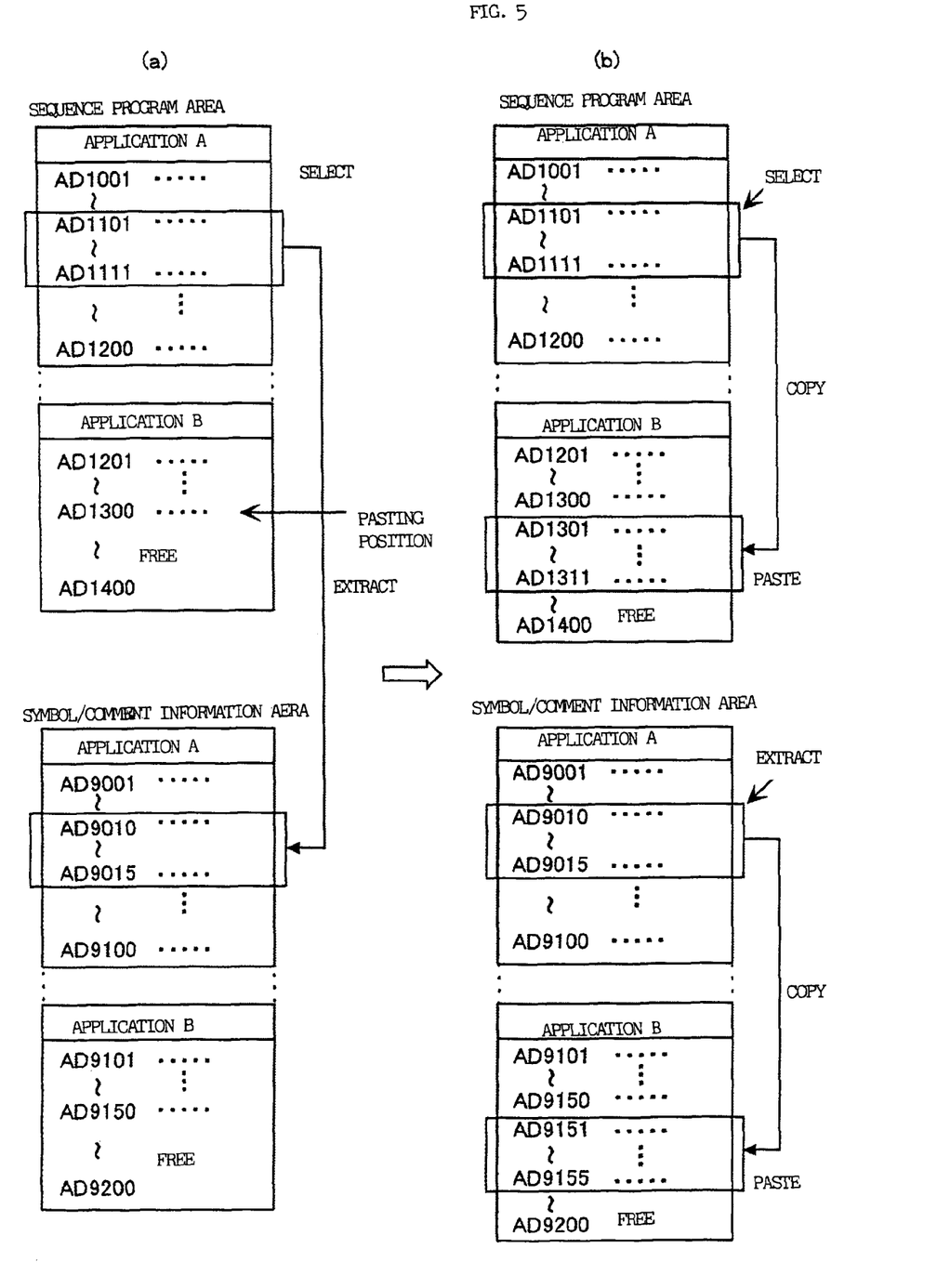
FIG. 5 shows schematic diagrams for explaining a copy operation using the editing apparatus in FIG. 4.

A program selecting process and a symbol/comment extracting process according to the present invention will be described below. FIG. 5 shows schematic diagrams for explaining a copying operation according to the present invention.

In the example shown in FIG. 5, the sequence program of the application A in the copy source is stored at the addresses AD1001 to AD1200 in the sequence program area, and the sequence program of the application B in the copy destination is stored at the addresses AD1201 to AD1400 in the sequence program area. The symbol information and the comment information included in the sequence program of the application A are stored at the addresses AD9001 to AD9100 in the symbol/comment information area, and symbol information and comment information included in the sequence program of the application B are stored at the addresses AD9101 to AD9200 in the symbol/comment information area.

As shown in FIG. 5(*a*), the selecting unit 4 selects a program part in the sequence program area at the addresses AD1101 to AD1111 from the program storing unit 2 of the application A. The selecting unit 4 designates a pasting position on which the copied program part is to be pasted in the sequence program area of the program storing unit 2 of the application B serving as the copy destination.

The symbol or the comment used in the program part selected by the selecting unit 4 are retrieved and extracted from the symbol/comment information area of the application A. FIG. 5(*a*) shows that the symbol or the comment used in the selected program part is stored at the addresses AD9010 to AD9015 corresponding to the addresses AD1101 to AD1111 of the selected program part. Therefore, the information stored at the addresses is extracted by the extracting unit 5.

Correspondence between the sequence program and the symbol/comment information can be achieved by, for example, adding the address of information corresponding to the sequence program or preparing a corresponding table.

As shown in FIG. 5(*b*), the program part selected from the sequence program area of the application A is pasted at a pasting position in the sequence program of the application B of the copy destination to copy the program part, and the symbol information and the comment information extracted by the extracting unit 5 are copied and pasted on a free area (addresses AD9151 to AD9155) in the symbol/comment information area of the application B.

An address determining process performed in the copying process will be described below with reference to FIG. 6. The address determination is performed to determine whether the address of the program part of the copy source or the address of the symbol/comment information included in the program part can be used as the address of the sequence program or the address of symbol/comment information of the copy destination or not. For example, the determination whether the address is available or not includes a determination whether a free area prepared in the sequence program of the copy destination has an area enough to store a program part to be copied on the free area or not, a determination whether the address set in the program part of the copy source and the address of the sequence program of the copy destination overlap or not, or the like.

Figure 6:
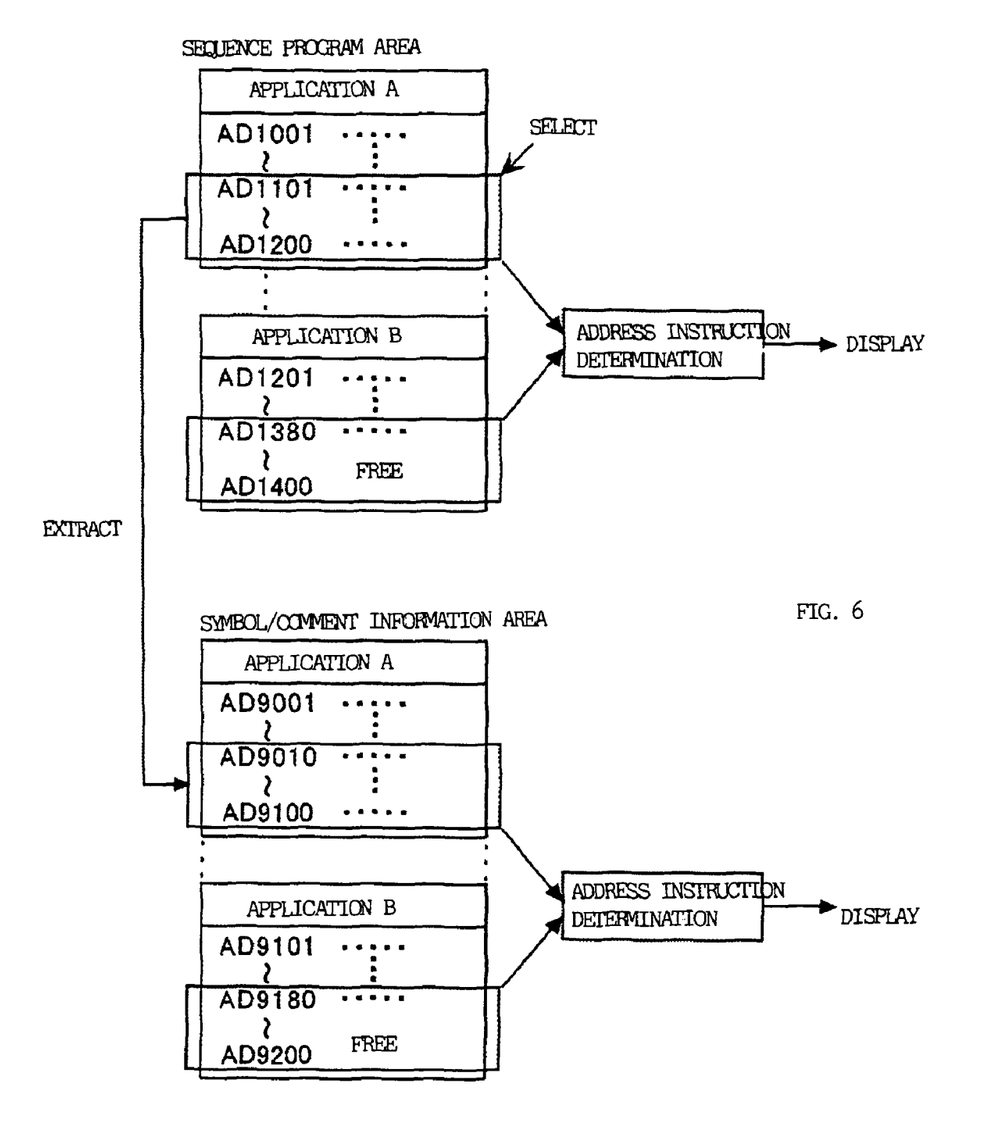
FIG. 6 is a diagram for explaining an address determining process in a copying process using the editing apparatus in FIG. 4.

FIG. 6 shows an example in which it is determined whether the sequence program of the copy destination has a sufficient free area or not.

As shown in FIG. 6, when a program part at the address AD1101 to AD1200 is selected from the sequence program of the application A and copied in the free area of the sequence program of the application B, if the free area of the sequence program of the copy destination is an area at the addresses AD1380 to AD1400, a data amount which can be stored in the area is smaller than a data amount of the selected program part. For this reason, the program part cannot be copied in the free area. In such a case, in the address determination, it is determined that the selected address region (program part) cannot be copied in the sequence program of the copy destination. The determination result is displayed on the display screen.

The same determination as described above can also be performed with respect to the extracted symbol/comment information. For example, as shown in FIG. 6, when a part (addresses corresponding to the addresses AD1101 to AD1200 of the selected program part) corresponding to the addresses AD9010 to AD9100 extracted by the extracting unit 5 from the symbol/comment information area of the application A is copied on the free area in the symbol/comment information area of the application B, if the free area of the copy destination is an area at the addresses AD9180 to AD9200, a data amount which can be stored in the area is smaller than a data amount of the extracted part. For this reason, the extracted part cannot be copied on the free area. In such a case, in the address determination, it is determined that the extracted part cannot be used in the copy destination. The determination result is displayed on the display screen.

When it is displayed on the display screen by the address determination that the address cannot be available, a program editor performs a process of extending the program area of the copy destination or other processes to perform adjustment such that the address of the selected program part or the address of the extracted part can be used in the copy destination.

In an instruction determination, an instruction word included in an address region selected by the sequence program of the copy source is compared with an instruction word used in the sequence program of the copy destination to determine whether the instruction word used in the sequence program of the copy source is defined in the sequence program of the copy destination or not, and whether the instruction words are differently defined in the copy source and the copy destination or not although the instruction words are equal to each other, or the like, thus determining whether or not the instruction words can be used in the sequence program of the copy destination.

The determination of the instruction words can be performed by the following method. That is, when the program includes an instruction word uniquely set in the program, the fact that the instruction word is unique is set in the symbol information or the comment information to allow retrieval of the setting items. Furthermore, the contents of the instruction words are described in the symbol information or the comment information to make it possible for a creator or an editor to perform a program creating/editing process with reference to the description.

What is claimed is:

1. A sequence program editing apparatus which performs creation and editing of a sequence program, comprising:

program storing means for storing an application program including the sequence program;

information storing means for storing at least one of symbol information and comment information used in the sequence program, wherein the program storing means and the information storing means have unique available address regions;

selecting means for, in a state in which a plurality of application programs including at least first and second application programs run, selecting at least a part of a sequence program displayed on an application screen run by the first application program;

extracting means for extracting the at least one of symbol information and comment information included in at least the selected part of the sequence program from the information storing means;

copy means for copying at least the selected part of the sequence program to the sequence program displayed on the application screen run by the second application program and copying the at least one of extracted symbol information and extracted comment information to information storing means of the second application;

address determining means for determining whether the address region of the selected part of the first application program can be copied to an address region of the second application program or not when at least a part of the sequence program selected by the selecting means is copied from the first application program onto the second application program, wherein the address of the determined available address region and unavailable address region are identifiably displayed on the basis of a determination result obtained by the address determining means; and instruction determining means for determining whether an instruction word used in the first application program is an instruction word which can be used in the second application program or not, wherein an available instruction word and an unavailable instruction word are identifiably displayed on the basis of a determination result obtained by the instruction determining means.

2. The sequence program editing apparatus according to claim 1, wherein the selecting means designates a copy destination in the sequence program displayed on the application screen run by the second application program, and the copy means copies at least the selected part of the sequence program at an address of the sequence program of the copy destination designated by the selecting means.

3. The sequence program editing apparatus according to claim 1, further comprising output means for outputting the selected sequence program and the extracted at least one of symbol and comment information in a mnemonic code.

* * * * *

UNITED STATES PATENT AND TRADEMARK OFFICE
CERTIFICATE OF CORRECTION

PATENT NO.       : 7,721,255 B2                                                   Page 1 of 1
APPLICATION NO. : 11/238953
DATED            : May 18, 2010
INVENTOR(S)      : Kimio Maeda et al.

It is certified that error appears in the above-identified patent and that said Letters Patent is hereby corrected as shown below:

First Page Column 2 (Other Publications), Line 2, change "pf publication" to --of publication--.

First Page Column 2 (Abstract), Line 1-8,
Delete "A sequence program editing apparatus according to the present invention includes: program storing means for storing an application program including the sequence program; information storing means for storing symbol information and/or comment information used in the sequence program; selecting means for, in a state in which a plurality of application programs including at least first and second application programs runs, selecting at least a part of a sequence program displayed on an application screen run by the first application program; extracting means for extracting the symbol information and/or the comment information included in at least the selected part of the sequence program from the information storing means; and copy means for copying at least the selected part of the sequence program on the sequence program displayed on the application screen run by the second application program and copying the extracted symbol information and/or the extracted comment information on the information storing means of the second application." and insert -- A sequence program editing apparatus includes a program storing unit for storing an application program including a sequence program, an information storing unit for storing symbol/comment information used in the sequence program, a selecting unit for selecting a part or a whole of a sequence program displayed on an application screen run by the first application program, an extracting unit for extracting the symbol/comment information included in the selected sequence program from the information storing unit, and a copy unit for copying the selected sequence program on the application screen run by the second application program and copying the extracted symbol/comment information on the information storing unit of the second application --.

Column 2, Line 51, after "means" delete "of the first application".

Signed and Sealed this

Fourteenth Day of September, 2010

David J. Kappos
*Director of the United States Patent and Trademark Office*